US005356963A

United States Patent [19]
Kauffman et al.

[11] Patent Number: 5,356,963
[45] Date of Patent: Oct. 18, 1994

[54] HYDROPHILIC HOT MELT ADHESIVES

[75] Inventors: Thomas F. Kauffman, Easton, Pa.;
Gary Raykovitz, Flemington, N.J.;
Lydia Wagner, Bedminster, N.J.;
Matthew Sharak, Franklin Park,
N.J.; Charles Paul, Madison, N.J.

[73] Assignee: National Starch and Chemical Investment Holding Corporation, Wilmington, Del.

[21] Appl. No.: 93,506

[22] Filed: Jul. 16, 1993

[51] Int. Cl.$^5$ .............................. C08J 5/10; C08L 1/26
[52] U.S. Cl. ......................................................... 524/43
[58] Field of Search .......................................... 524/43

[56] References Cited
FOREIGN PATENT DOCUMENTS 0199468 10/1986 European Pat. Off. .

OTHER PUBLICATIONS

Information Booklet, "Klucel® Hydroxypropylcellulose–Physical and Chemical Properties," Aqualon Company, REV Feb. 1991.
Butler, R. W. and Klug, E. D., "Hydroxypropylcellulose," *Handbook of Water–Soluble Gums and Resins*, Chapter 13, pp. 13-1 to 13-17, McGraw-Hill Book Company.

*Primary Examiner*—Nathan M. Nutter
*Attorney, Agent, or Firm*—Ellen T. Dec

[57] ABSTRACT

A hot melt adhesive composition comprising 5 to 50% by weight hydroxypropyl cellulose, 5 to 40% by weight plasticizer of which up to 85% may be a water insoluble plasticizer; 20 to 70% by weight tackifying resin; 0 to 40% by weight polar wax; 0 to 30% by weight compatible polymer; and, 0 to 3% by weight stabilizer.

10 Claims, No Drawings

HYDROPHILIC HOT MELT ADHESIVES

BACKGROUND OF THE INVENTION

Hot melt adhesives are used commercially for a wide variety of applications. The major advantage of hot melt adhesive systems is the lack of a carrier fluid which eliminates the need for drying the adhesive film once it is applied to the substrate. This elimination of the drying step overcomes hazards associated with solvent usage and also allows for faster production line speeds and lower transportation costs. Depending on the desired use, the degree of tack of the hot melt adhesives may be varied over a wide range to produce adhesives varying from pressure sensitive to non-pressure sensitive in character.

For various applications, it is also desired that some hot melt adhesives be hydrophilic, i.e., be water-soluble, water-sensitive or water-activated. Such hydrophilic adhesives find use, for example, in the construction of flushable disposable products including diapers and sanitary napkins where the high degree of tack which is needed during construction and use must be substantially decreased so as to prevent adhesion to porcelain and sewer pipes. Water activatible adhesives are used for remoistenable envelope seals and other labeling applications where subsequent repulpability is also beneficial. Water repulpable adhesives are particularly useful in applications involving bag sealing, case and carton sealing, bookbinding, roll wrapping and tissue ply-bonding.

Hot melt adhesives have historically been based on petroleum derived polymers such as polyethylene, ethylene-vinyl acetate, styrenic block copolymers and polypropylene. Water sensitive hot melts have also been prepared from vinyl pyrrolidone polymers including vinyl acetate/vinyl pyrrolidone copolymers. All these adhesive compositions are further tackified, plasticized and/or reinforced with a variety of resins, oils and/or waxes which are derived from both petroleum and naturally occurring feedstocks such as wood, gum and tall oil rosin and terpenes. These classic compositions suffer from the cyclical price cycles common to all oil derived materials and also are generally very resistant to degradation once the articles employing them are disposed of.

The present invention stems from the growing movement away from the use of adhesives which contain large amounts of petroleum derived raw materials towards those compositions containing higher levels of raw materials derived from renewable, natural resources which demonstrate some level of degradation. It also stems from the growing need for hydrophilic hot melt adhesives for flushable, repulpable and remoistenable applications.

SUMMARY OF THE INVENTION

We have now found that hydrophilic hot melt adhesive compositions suitable for a variety of application can be prepared by blending various adhesive components with hydroxypropyl cellulose. Thus, the present invention is directed to hot melt adhesive compositions prepared from 5 to 50% by weight hydroxypropyl cellulose; 5–40% by weight plasticizer, of which up to about 85% may be a insoluble plasticizer, (the remainder being a water soluble plasticizer); 20–70% by weight tackifying resin; 0–40% by weight polar wax; 0–3% by weight stabilizer and 0–30% by weight compatible polymer. The resulting adhesives can be formulated so as to have a high degree of tack when applied yet, when wet will lose tack. Alternatively, the adhesives may be formulated so as to be repulpable, redispersible or to be activated by moisture.

The hydroxypropyl cellulose component has been found to provide the unique properties to the adhesives of the present invention. The ability to use such levels of this relatively rigid, high melting point material in adhesives, especially pressure sensitive adhesives, is unexpected in light of the non-elastomeric character of the polymer.

The tackifying resins useful in the adhesive compositions are generally polar in nature and have a Ring and Ball softening point greater than 60° C. and include rosin and rosin derivatives, terpene phenolics, pure phenolic resins, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; and (2) phenolic modified terpene resins and hydrogenated derivatives thereof such, for example, as the resin product resulting from the condensation, in an acidic medium of a bicyclic terpene and a phenol. Mixtures of two or more of the above described tackifying resins, as well as blends of the above resins with small amounts of (e.g., less than about 10% of the adhesive) less compatible resins may be utilized for some formulations. Additionally, small amounts (i.e., less than the amount %) of rosin esters such as glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin may be used in combination with the previously described tackifiers. While the tackifier may comprise up to about 70% of the adhesive, it is generally used in amounts of about 20 to 60% by weight.

Depending on the end-use application, and particularly for uses requiring pressure sensitive properties, various compatible plasticizers or extending oils are present in the composition. Water soluble plasticizers always comprise at least about 15% of the total amount of the plasticizer component while water-insoluble plasticizers may comprise the remainder. Preferred compatible plasticizers include phthalate plasticizers such as dioctyl phthalate; liquid polyesters such as Dynacol 720 from Hüls; benzoate plasticizers such as 1,4cyclohexane dimethanol dibenzoate (e.g., Benzoflex 352 available commercially from Velsicol); phosphate plasticizer such as t-butylphenyl diphenyl phosphate (e.g., Sancticizer 154 available commercially from Monsanto); poly-(ethylene glycol) with molecular weight below about 1000 and derivatives of poly(ethylene glycol) (e.g., Pycal 94, the phenyl ether of PEG, available commercially from ICI); liquid rosin derivatives having Ring and Ball melting points below about 60° C. such as the methyl ester of hydrogenated rosin (e.g., Hercolyn D from Hercules); as well as vegetable and animal oils such as glycerol esters of fatty acids and polymerization products thereof. Particularly preferred diluents include phenyl ether of polyethylene-glycol and the ethoxylate of bisphenol A (e.g., Macol 206E available from PPG).

Other applications conventionally employing adhesives may require the use of wax diluents in order to reduce the melt viscosity or cohesive characteristics of the hot melt adhesive compositions without appreciably decreasing their adhesive bonding characteristics. These waxes are often used in adhesives which do not exhibit pressure sensitive properties.

Suitable waxes include 12-hydroxystearamide wax, hydrogenated castor oil, oxidized synthetic waxes, poly(ethylene oxide) having a weight average molecular weight above about 1000 and functionalized synthetic waxes such as carbonyl containing Escomer H101 from Exxon.

It should be recognized that some adhesive formulations described herein may contain both wax and plasticizer components so that the presence of one or the other is not mutually exclusive.

Among the applicable stabilizers or antioxidants which may be included herein are high molecular weight hindered phenols and multifunctional phenols such as sulfur and phosphorous-containing phenols. Representative hindered phenols include: 1,3,5-trimethyl-2,4,6-tris(3,5-di-tert-butyl-4-hydroxyphenyl) propionate; n-octadecyl 3,5-di-tert-butyl-4-hydroxyphenyl) propionate; 4,4'-methlenebis (2,6-di-tert-butylphenol); 4,4'-thiobis (6-tert-butyl-o-cresol); 2,6-di-tert-butylphenol; 6-(4-hydroxyphenoxy)-2,4-bis(n-octylthio)-1,3,5-triazine; di-n-octadecyl-3,5-di-tert-butyl-4-hydroxy-benzylphosphonate; 2-(n-octylthio)-ethyl 3,5-di-tert-butyl-4-hydroxybenzoate; and sorbitol hexa[3-(3,5-di-tert-butyl-4-hydroxyphenyl)propionate]. If used, the stabilizer is present in levels of about 0.1 to 3% by weight.

Optional additives may be incorporated into the hot melt compositions in order to modify certain properties thereof. Among these additives may be included colorants such as titanium dioxide; and fillers such as talc and clay, etc. There may also be present in the adhesive small amounts (.g., less than about 30% by weight, and preferably 5 to 20% by weight) of certain thermoplastic polymers such as ethylene vinyl acetate copolymers containing about 12 to 50% vinyl acetate, ethylene acrylic acid, ethylene methyl acrylate and ethylene n-butyl acrylate copolymers as well as caprolactone polymers and poly(hydroxybutyrate/hydroxyvalerate). These polymers are employed in order to impart flexibility, toughness and strength. Alternatively, and in particular, it may be desirable to incorporate into the hot melt adhesive up to 20% by weight of certain hydrophilic polymers such as polyvinyl alcohol, hydroxyethyl cellulose, polyvinyl methyl ether, poly(ethylene oxide), or modified or derivatized starch which will function to increase the water sensitivity of the adhesives which may be desired for some applications.

Other compatible polymers include elastomeric polymers such as styrene containing block copolymers, e.g., styrene-isoprene-styrene, styrene-butadienestyrene, styrene-ethylene butylene-styrene, styrene-ethylene propylene styrene may also be present. Of these polymers, those based on styrene-isoprene-styrene are most preferred. These polymers are particularly useful in pressure sensitive adhesives formulated as disposable diaper construction adhesives and may be used at levels up to about 30% by weight. It is unexpected that these relatively non-polar elastomers would exhibit useful compatibility in hydroxypropylcellulose based hot melts.

The hot melt adhesive compositions of the invention may be formulated using techniques known in the art. An exemplary procedure involves placing approximately 40% of the total tackifying resin concentration with all the polymer, wax, plasticizers and stabilizers in a jacketed mixing kettle, preferably in a jacketed heavy duty mixer, which is equipped with rotors and thereupon raising the temperature to a range of from up to about 190° C. After the resin has melted, the temperature is lowered to 150° to 165° C. Mixing and heating are continued until a smooth, homogeneous mass is obtained whereupon the remainder of the tackifying resin is thoroughly and uniformly admixed therewith.

As noted above, the hydroxypropyl cellulose containing hydrophilic hot melt adhesives of the invention will be formulated differently depending upon the particular end use. In general, pressure sensitive adhesives may be formulated from 5–50% hydroxypropyl cellulose, 5–40% plasticizer, 20 to 70% tackifying resin, 0–3% stabilizer and 0–30% compatible polymer. More specifically, pressure sensitive adhesives which lose tack when immersed in water are prepared from 10–50% hydroxypropyl cellulose, 5–40% plasticizer, 20–70% tackifying resin, 0–3% stabilizer, and 0–30% compatible polymer. The latter class of pressure sensitive adhesives are useful not only in the construction of disposable personal products but also for other applications where repulpability or redispersibility are important.

Other repulpable, redispersible and/or remoistenable hot melt adhesives which do not possess pressure sensitive properties may be prepared from 10–50% hydroxypropyl cellulose; 5–40% plasticizer (up to 85% of which may be a water insoluble plasticizer); 20–70% tackifying resin; 5–40% polar wax; and 0–20% compatible polymer.

Specific, hot melt adhesives for various end uses are described below.

|  | Repulpable HM PSA | Water Sensitive HM PSA | Repulpable Case and Carton HM | Repulpable Bookbinding HM | Repulpable Bag Sealing HM | Remoistenable HM |
|---|---|---|---|---|---|---|
| Hydroxypropyl Cellulose | 5–50 | 10–50 | 10–40 | 15–50 | 15–40 | 10–50 |
| Polar Wax | — | — | 5–30 | 5–30 | 10–30 | 10–40 |
| Plasticizer | | | | | | |
| (Total) | 5–40 | 5–40 | 5–30 | 5–40 | 5–30 | 5–40 |
| Non water soluble | 0–34 | 0–34 | 0–26 | 0–26 | 0–26 | 0–34 |
| Water soluble | 6–40 | 6–40 | 4–30 | 4–30 | 4–30 | 6–40 |
| Tackifying Resin | 20–70 | 20–70 | 30–70 | 30–60 | 30–60 | 20–60 |
| Compatible Polymer | 0–30* | 0–30* | 0–10 | 0–20* | 0–20 | 0–20 |

-continued

|  | Repulpable HM PSA | Water Sensitive HM PSA | Repulpable Case and Carton HM | Repulpable Bookbinding HM | Repulpable Bag Sealing HM | Remoistenable HM |
| --- | --- | --- | --- | --- | --- | --- |
| Filler | — | — | — | 0–20 | 0–20 | 0–20 |
| Stabilizer | 0–3 | 0–3 | 0–3 | 0–3 | 0–3 | 0–3 |

*Sytrene block copolymers are particularly preferred in these formulations.

As noted above, the resulting adhesives may be employed in a wide variety of uses as are known in the art. The adhesives may be effectively utilized in a variety of packaging and carton sealing applications. The non-pressure sensitive adhesives may also be used to bind a plurality of sheets in a wide range of bookbinding operations. They may also be used for laminating tissue and/or screen-reinforced tissue layers such as are used in individual or roll use applications as in wipers, paper towels, toilet tissue and other consumer or industrial end uses. When formulated with plasticizers, the resultant adhesives may be used in the assembly or construction of various disposable applications including, but not limited to, sanitary napkins, disposable diapers, hospital gowns, bed pads and the like. In particular, adhesives are useful for the assembly of disposable articles using multi-line, spray, or slot-coating construction techniques wherein at least one flexible film substrate is bonded to at least one tissue, non-woven, polyolefin or other flexible polymeric film substrate. In addition, the adhesives may be useful in the bonding of elastic to polyethylene, polypropylene or non-woven substrate so as, for example, to impart elongation resistant gathers thereto. The adhesive may also be utilized in less demanding disposable construction applications such as for end or perimeter sealing.

In the following illustrative examples all parts are given by weight and all temperatures in degrees Celsius unless otherwise noted.

EXAMPLE I

In preparing the following samples, a heavy duty mixer which had been heated to 150–160° C. and which was equipped with sigma blades was charged with the total amount hydroxypropyl cellulose and ½ to ⅔ of the plasticizers. Mixing was then initiated whereupon the tackifying resin was slowly added followed by wax and remaining plasticizer was added slowly over a one-half hour period. Heating and mixing were continued until a homogeneous mass was obtained.

The samples were tested using the following procedures:

Viscosity measurements were determined after 30 minutes using a Brookfield viscometer (Spindle 27) at 250° F., 275° F., or 300° F.

Contact Anqle: A ½ mil film of the hot melt to be tested is made on a 3"×1"×1 mm microscope slide. The Rame-Hart Goniometer (Model 100-06) outfitted with a Polaroid camera attachment (Model 100-14) and a Micro-syringe attachment (Model 100-10) is used to measure contact angle. A micro-syringe is filled with deionized water, and a drop of water is placed on top of the hot melt. The normal filming sequence is as follows:
1. Cock the shutter
2. Watch the drop fall
3. Press the shutter release mechanism on the cable.

Measure the angle made by the bottom of the drop to the side of the drop of water on the Polaroid picture.

The lower the contact angle, the more hydrophlic, i.e., water sensitive, is the adhesive. This property is particularly important in flushable applications and for bonding super-absorbent polymers.

Loop Tack From Polyethylene Film-Loss of Tack: The test is used to determine the relative quick stick-/tackiness and the immediate loss of tack after immersion in water.
1. A 2–3 mil coating of adhesive to mylar, using rollers heated to approximately 300° F.
2. Adhesive application temperature should be 300–350° F.
3. Cut five 1"×5" strips in the machine direction from the coated mylar. Condition 24 hours at constant temperature and humidity.
4. Fold bonds into a loop by taking the 1"ends and taping them together with 1"masking tape.
5. Fasten polyethylene to the stainless steel plate using double sided tape.
6. Place the loop into the machine's jaws and test.
7. Using a new 1"×5" strip quickly immerse the strip in water at room temperature and immediately test as described above.

Thermal Stability: The purpose of this test is to check the compatibility of the formulation's raw materials, the pot life and to make sure the formulation will not clog an applicator nozzle.
1. First determine the initial viscosity of the hot melt sample.
2. Place 100 g of sample in a clean 8 oz. short jar (if one does not have enough sample run the test with 30 g in a 4 oz. short jar). Cover with aluminum foil and place in an air circulating oven at the desired testing temperature, typically 250°–350° F.
3. After the testing period, remove the jar, check for the following:
   a. Skin
   b. Dirt/char particles
   c. Sedimentation - partial skin precipitating and falling to the bottom of the jar.
   d. Volatile char
   e. Gelation - carefully examine the contents with a glass stirring rod for signs of gels or lumps.
   f. Color or odor
   g. Product separation - the presence of distinct layers, also known as phasing.
4. Determine the final viscosity of the hot melt sample. A final viscosity is not done for products which have skinned or separated.

EXAMPLE 1

This example illustrates the superior thermal stability of the composition of the present invention.

|                                                      | A         | B      |
|------------------------------------------------------|-----------|--------|
| Klucel E (Hydroxypropyl Cellulose) (Aqualon)         | 30.0      | 30.0   |
| Unitac R-86 (Polyol ester of rosin) (Union Camp)     | 40.0      | —      |
| Foral NC (Basic treated hydrogenated rosin) (Hercules) | —       | 40.0   |
| Hercolyn D (Methyl ester of rosin) (Hercules)        | 10.0      | 10.0   |
| Pycal 94 (Phenyl ether of polyethylene glycol) (ICI) | 20.0      | 20.0   |
| Irganox 1010 (Hindered Phenol antioxidant) (Ciba-Geigy) | 0.5    | 0.5    |
| Viscosity @ 275° F.                                  | Not Tested | 43,900 |
| Thermal Stability (24 hrs/250° F.)               |           |        |
| color                                                | yellow    | brown  |
| gel/skin                                             | yes       | none   |
| separation                                           | yes       | none   |
| char                                                 | none      | none   |
| Thermal Stability (48 hrs/275° F.)               |           |        |
| color                                                | ↑         | brown  |
| gel/skin                                             | not       | none   |
| separation                                           |           | none   |
| char                                                 | tested    | none   |
| final viscosity @ 275° G                             | ↑         | 47,500 |
| Δ %                                                  |           | +8.2   |

As the results presented above indicate, for this application Adhesive B formulated with hydrogenated rosin yields superior thermal stability properties when compared to Adhesive A prepared with rosin ester.

EXAMPLE 2

This example illustrates the preparation of pressure-sensitive hot melt adhesive in accordance with the teaching of the present invention.

|                              | C              | D              |
|------------------------------|----------------|----------------|
| Klucel E                     | 15.0           | 35.0           |
| Foral NC                     | 57.5           | 35.0           |
| Hercolyn D                   | 12.5           | 5.0            |
| Pycal 94                     | 15.0           | 25.0           |
| Irganox 1010                 | 0.5            | 0.5            |
| Viscosity @ 275° F.          | 2,685 cps      | 42,500         |
| Loop Tack                    | 26.5 oz/in$^2$ | 0 oz/in        |
| 180° Peel (Mylar SS)         | 2.0 lb/in      | 2.0 lb/in      |
|                              | (NO TRANSFER)  | (NO TRANSFER)  |
| Holding Power                | 4.5 minutes    | 31 minutes     |
| Thermal Stability (72 hrs/275°) |         |                |
| color                        | brown          | brown          |
| char                         | none           | none           |
| skin/gel                     | none           | none           |

As the result show, both Adhesives C and D exhibit appreciable pressure-sensitive adhesion (180° Peel). Adhesive C has higher tack (loop tack), whereas Adhesive D has higher cohesive strength (holding power).

EXAMPLE 3

This example illustrates the use of a variety of plasticizers as well as various grades of hydroxypropyl cellulose.

|                      | E        | F        | G        | H        | I               |
|----------------------|----------|----------|----------|----------|-----------------|
| Klucel J (140,000 MW) | 15      | —        | 15       | 15       | 15              |
| Klucel E (80,000 MW)  | —       | 15       | —        | —        | —               |
| Pycal 94             | 15       | 15       | —        | —        | —               |
| Macol 206 E[1]       | —        | —        | 15       | —        | —               |
| Benzoflex 50[2]      | —        | —        | —        | 15       | —               |
| PEG 600[3]           | —        | —        | —        | —        | 15              |
| Hercolyn D           | 12.5     | 12.5     | 12.5     | 12.5     | 12.5            |
| Foral NC             | 57.5     | 57.5     | 57.5     | 57.5     | 57.5            |
| Irganox 1010         | 0.5      | 0.5      | 0.5      | 0.5      | 0.5             |
| Compatibility        | GOOD     | GOOD     | GOOD     | GOOD     | GOOD            |
| Finger Tack          | Moderate | High     | Low      | Moderate | Moderate/High   |

[1] Ethoylate of bisphenol A from PPG.
[2] Benzoate ester from Velsicol Chemical
[3] Polyethylene glycol (600 MW) from Dow

EXAMPLE 4

This example illustrates the use of Adhesive C, prepared in Example 2, as a repulpable hot melt pressure sensitive adhesive. The adhesive was subjected to a modified version of TAPPI UM 213 using the following parameters:

| Mixer Speed | 18,000 RPM (Household Blender) |

-continued

| Water Temperature | 120° F. |
| --- | --- |
| Residence Time | 5 minutes |
| Screen size (mesh) | 200 |
| Adhesive Thickness | 1 mil |

The adhesive yielded fair/good repulpability with little evidence of undispersed adhesive after handsheet was reformed.

EXAMPLE 5

This example illustrates the preparation of a redispsersible hot melt pressure sensitive adhesive.

| | Adhesive J |
| --- | --- |
| Klucel J (Hydroxypropyl cellulose) | 15.0 |
| Foral NC | 57.5 |
| Hercolyn D | 12.5 |
| Pycal 94 | 15.0 |
| Irganox 1010 | 0.5 |
| Viscosity @ 275° F. | 35,300 |
| Viscosity @ 300° F. | 12,700 |
| Loop Tack | 3.5 oz/in$^2$ |
| 180° Peel (mylar/ss) | 1.2 lb/in |
| Holding Power (4 PSI) | 12 minutes |

The above adhesive was then tested by TAPPI UM 666 to determine its redispersibility. After 10 minutes at 160° F., 86% had redispersed as contrasted to conventional pressure sensitive hot melt adhesives which yield less than 20% dispersed.

This method (TAPPI UM 666) is intended to be a more quantifiable indicator of repulpability than TAPPI UM 213 (see Example 3).

EXAMPLE 6

This example illustrates the preparation of a repulpable hot melt containing wax.

Many hot melt adhesives such as are used for case and carton sealing are not pressure-sensitive in nature. In these applications, they are required to exhibit fast setting speed and high heat resistance. This example demonstrates packaging (case or carton sealing) hot melts which are fast setting, with good adhesion to paper stocks, high heat resistance, and repulpability (or redispersibility ).

| | K | L | M |
| --- | --- | --- | --- |
| Klucel E | 25 | 25 | 25 |
| Foral NC | 28 | 40 | 35 |
| PEG 600 | 17 | | |
| Pycal 94 | | 13 | 13 |
| Paricin 220[1] | 20 | 20 | 20 |
| Hercolyn D | 10 | | 5 |
| Kenamide S[2] | | 2 | 2 |
| Irganox 1010 | 0.5 | 0.5 | 0.5 |
| Viscosity @ 275° F. | 3625 | 6800 | 5125 |
| Viscosity @ 300° F. | 1690 | 2318 | 2300 |
| Set Speed | 4 sec | 9–10 sec | 5–6 sec |
| Peel | 100 | 120 | 130 |
| Shear | 170 | 160 | 160 |
| Adhesion (corrugated) | | | |
| RT | F.T. | F.T. | F.T. |
| 40 | F.T. | F.T. | F.T. |
| 0 | F.T. | F.T. | F.T. |
| Dispersibility (10 min/160° F.) Tappi UM 666 | 96.5% | 81.6% | 88.9% |
| Heat Stability (24 hrs/275° F.) | | | |
| color | brown | brown | brown |
| skin/gel | none | none | none |

[1]Hydroxy stearamide from CasChem
[2]Fatty stearamide wax from Witco

EXAMPLE 7

This example demonstrates the use of similar formulations as remoistenable hot melts.

| | N | O |
| --- | --- | --- |
| Klucel E | 35.0 | 35.0 |
| Foral NC | 28.0 | 28.0 |
| Pycal 94 | 2.0 | 2.0 |
| Paricin 220 | 25.0 | 25.0 |
| Kenamide S | 5.0 | |
| Kenamide W-40 | | 5.0 |
| Hercolyn D | 10.0 | 10.0 |
| Irganox 1010 | 0.5 | 0.5 |
| Viscosity @ 250° F. | 52,000 cps | 88,500 cps |
| Viscosity @ 300° F. | 9250 cps | 12850 cps |
| Set Speed | 5 sec | 5 sec |
| Remoistening Character* | Fiber Tear | Fiber Tear |
| Humidity Blocking ** | | |
| 75% Rlt | slight cling to adjacent paper but no fiber tear | |
| 81% Rlt | slight cling to adjacent paper but no fiber tear | |
| 84% Rlt | slight cling to adjacent paper but no fiber tear | |

*1 mil film coated on paper allowed to set up (dry/harden)
Remoistened with wet paper towel and then mated to paper (2½ lb roller)

EXAMPLE 8 (Comparative)

This example illustrates the criticality of the use of the hydroxypropyl cellulose component by comparing adhesives made according to the invention with similar adhesives prepared with other cellulosic derivatives.

| | 1 | 2 | 3 | 4 | 5 | 6 |
| --- | --- | --- | --- | --- | --- | --- |
| Benecel (non-ionic cellulose ether)* | 25 | 25 | | | | |
| Natrosol Plus Type 330 (modified hydroxyethyl cellulose)* | | | 25 | 50 | | |
| Carboxymethyl Cellulose | | | | | 25 | 35 |
| Foral NC | 40 | 40 | 40 | 40 | 40 | 40 |
| Pycal 94 | 35 | | 13 | 10 | 13 | 13 |
| Paricin 220 | — | — | 20 | | 20 | 10 |
| PEG 600 | | 15 | | | | |
| Hercolyn D | | 20 | | | | |
| Irganox 1010 | 0.5 | 0.5 | 0.5 | 0.5 | 0.5 | 0.5 |
| Kenamide-S | | | | | 2 | 2 |

*From Hercules.
All adhesive formations were incompatible upon mixing.

EXAMPLE 9

This example highlights the very unexpected finding that hydrophobic elastomeric polymers such as styrene-isoprene block copolymers are compatible with the hydroxypropyl cellulose and the other polar plasticizers (both water soluble and non-water soluble). It is very unexpected that heat stability or pot stability is not compromised by doing so. The use of elastomeric polymers in conjunction with the hydroxypropyl cellulose yields extremely tacky, elastomeric hot melts which lose tack upon contact with water (e.g., as in flushable applications). This approach can also be used to develop repulpable pressure-sensitive hot melts.

|  | P | Q | R |
|---|---|---|---|
| Klucel E | 10 | 10 | 10 |
| Vector 4111 | 20 | | |
| Vector 4411 | | 20 | 20 |
| Foral NC | 74 | 74 | 50 |
| Pycal 94 | 20 | 20 | 20 |
| Irganox 1010 | 0.5 | 0.5 | 0.5 |
| Viscosity @ 275° F. | 995 cps | 4250 cps | 6350 cps |
| Contact Angle | 61° | 52° | 62° |
| Looptack from poly | 42.3 oz./in$^2$ | 36.3 oz./in$^2$ | 7.7 oz./in$^2$ |
| Tensile strength: | | | |
| Yield | 8.9 psi | 7.2 psi | 11.4 psi |
| Ultimate | 8.9 psi | 54.6 psi | 56.7 psi |
| % elong. @ break | 5400% | 2088% | 1621% |
| HDPE 180° Peel (2'/min crosshead) | 6.8#/li v. heavy transfer | 3.0#/li (no transfer) | 0.3#/li (sl. residue) |

Vector 41111 and 4411 are styrene isoprene styrene copolymers from Dexco containing 18 and 44% styrene respectively.

Samples Q and R which contain the higher styrene content polymer give higher cohesive strength as displayed by no transfer in HDPE test and ultimate tensile strength.

We claim:

1. A hot melt pressure sensitive adhesive composition consisting essentially of 5 to 50% by weight hydroxypropyl cellulose; a styrene block copolymer present in an amount up to 30% by weight; 5 to 40% by weight plasticizer, about 85% of which may be a water insoluble plasticizer, 20 to 70% by weight tackifying resin; and 0 to 3% by weight stabilizer, the components totaling 100% by weight.

2. The hot melt pressure sensitive adhesive of claim 1 wherein the styrene block copolymer is selected from the group consisting of styrene-isoprene-styrene, styrene-butadiene-styrene, styrene-ethylene butylene-styrene and styrene-ethylene propylene-styrene.

3. The hot melt pressure sensitive adhesive of claim 2 wherein the styrene block copolymer is styrene-isoprene-styrene.

4. The hot melt pressure sensitive hot melt adhesive of claim 3 wherein the block copolymer contains about 44% styrene.

5. The hot melt adhesive of claim 1 wherein the tackifying resin is polar in nature and has a Ring and Ball softening point greater than 60° C. and is selected from the group consisting of natural and modified rosins, phenolic modified terpene resins and the hydrogenated derivatives thereof.

6. The hot melt adhesive of claim 1 wherein the platicizers is selected from the group consisting of phthalate plasticizers dioctyl phthalate; liquid polyesters; benzoate plasticizers; phosphate plasticizers; poly(ethylene glycol) with molecular weight below about 1000 and derivatives thereof; liquid rosin derivatives having Ring and Ball melting points below about 60° C.; vegetable and animal oils and polymerization products thereof.

7. The hot melt adhesive of claim 6 wherein the plasticizer is phenyl ether of polyethylene-glycol or the ethoylate of bisphenol A.

8. The hot melt pressure sensitive adhesive of claim 1 containing 20% to 30% by weight of styrene block copolymer.

9. A hot melt pressure sensitive adhesive which loses tack when immersed in water, said adhesive consisting essentially of 10 to 50% by weight hydroxypropyl cellulose; a styrene block copolymer present in an amount up to 30% by weight; 5 to 40% by weight plasticizer, about 85% of which may be a water insoluble plasticizer; 20 to 70% by weight tackifying resin; and 0 to 3% by weight stabilizer, the components totaling 100% by weight.

10. The hot melt pressure sensitive adhesive of claim 9 containing 20% to 30% by weight of styrene block copolymer.

* * * * *